US006801948B2

(12) United States Patent
Clark et al.

(10) Patent No.: US 6,801,948 B2
(45) Date of Patent: Oct. 5, 2004

(54) SYSTEM AND METHOD FOR A STREAMS BASED NETWORK ACCESS CONTROL FOR A COMPUTER

(75) Inventors: Brett Miller Clark, Buford, GA (US); Patricia Joyce Leima, Duluth, GA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 751 days.

(21) Appl. No.: 09/738,078

(22) Filed: Dec. 15, 2000

(65) Prior Publication Data

US 2001/0023449 A1 Sep. 20, 2001

(51) Int. Cl.[7] .............................................. G06F 15/16
(52) U.S. Cl. ...................... 709/231; 709/220; 709/230; 709/250; 370/230; 370/235; 370/254; 370/401
(58) Field of Search ................................ 709/220, 224, 709/230–231, 236–238, 250; 370/229–235, 254, 401, 466, 469; 710/1, 33, 105

(56) References Cited

U.S. PATENT DOCUMENTS

| 5,640,399 | A  | * | 6/1997  | Rostoker et al. ............ 370/466 |
| 5,699,350 | A  | * | 12/1997 | Kraslavsky ................. 370/254 |
| 6,363,432 | B1 | * | 3/2002  | Laber .......................... 709/250 |
| 6,442,612 | B1 | * | 8/2002  | Hugosson et al. .......... 709/230 |
| 6,446,200 | B1 | * | 9/2002  | Ball et al. ................... 709/220 |
| 6,477,143 | B1 | * | 11/2002 | Ginossar ..................... 709/230 |
| 6,591,304 | B1 | * | 7/2003  | Sitaraman et al. .......... 709/238 |
| 6,625,657 | B1 | * | 9/2003  | Bullard ....................... 709/237 |
| 6,665,724 | B2 | * | 12/2003 | Lawrence ................... 709/230 |
| 6,732,191 | B1 | * | 5/2004  | Baker et al. ................ 709/250 |

* cited by examiner

Primary Examiner—Bharat Barot

(57) ABSTRACT

A system communicates a packet through a streams-based network protocol stack to a network interface card that includes an interface attribute. A session filter module and a network filter module are in communication with the network protocol stack. A table of network attributes, associated with the session filter module and network filter module, is use to determine whether the network interface card can be accessed. A method comprises operating a software process that includes a network endpoint attribute, communicating packets through a network protocol stack to a network interface card, having an interface attribute, and comparing the network endpoint attribute with the interface attribute to determine whether the software process can access the network interface card.

21 Claims, 13 Drawing Sheets

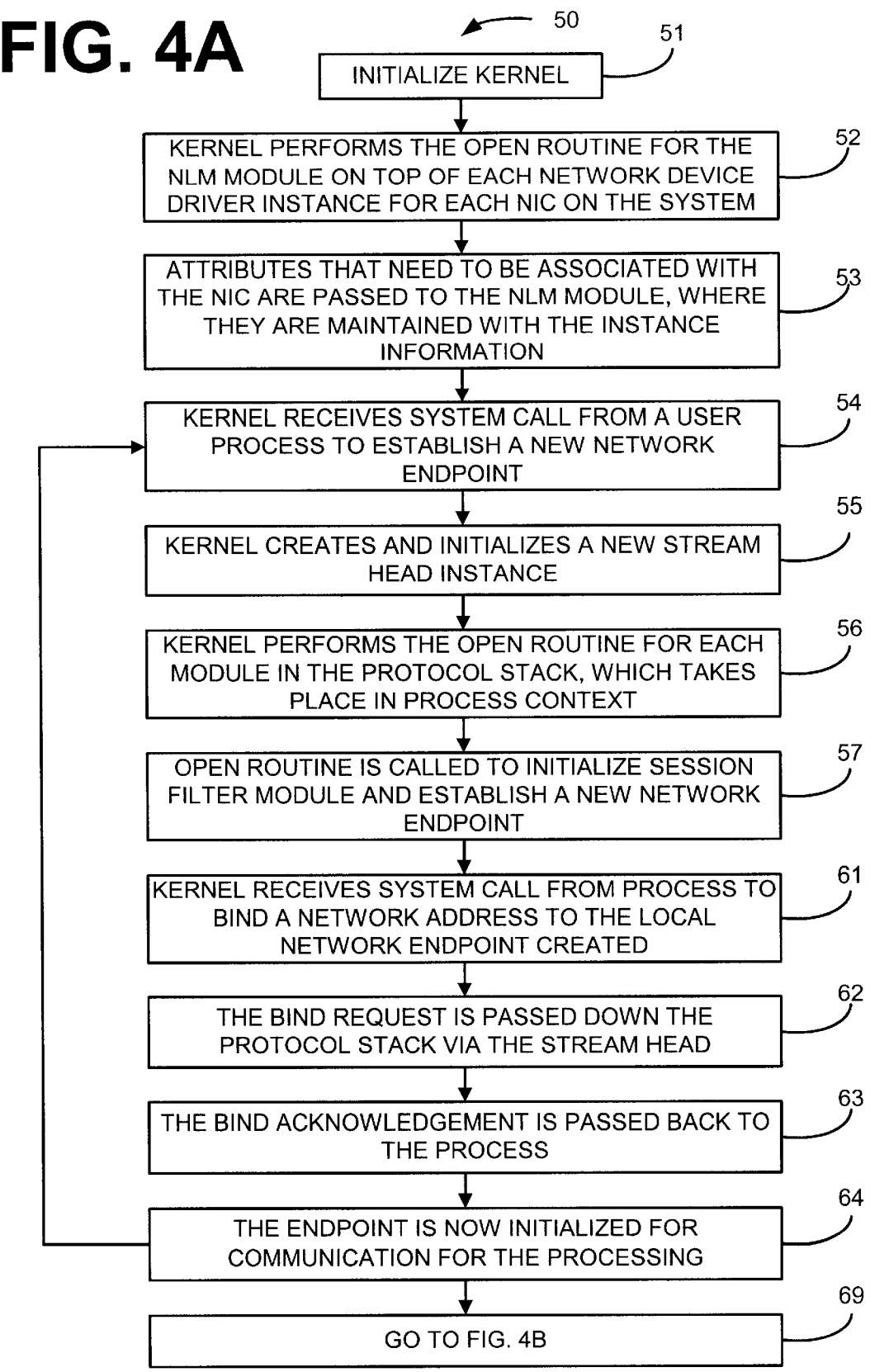

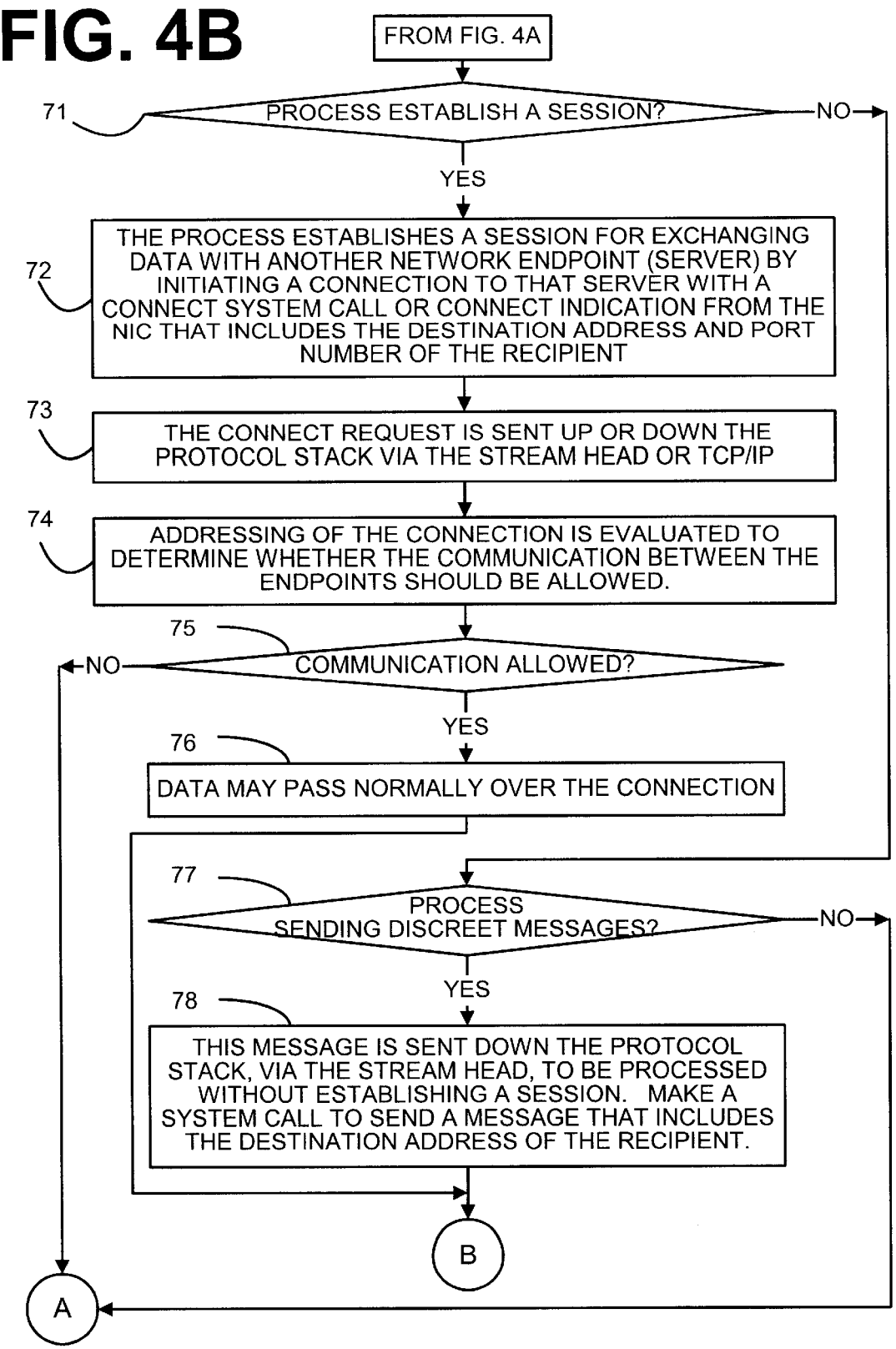

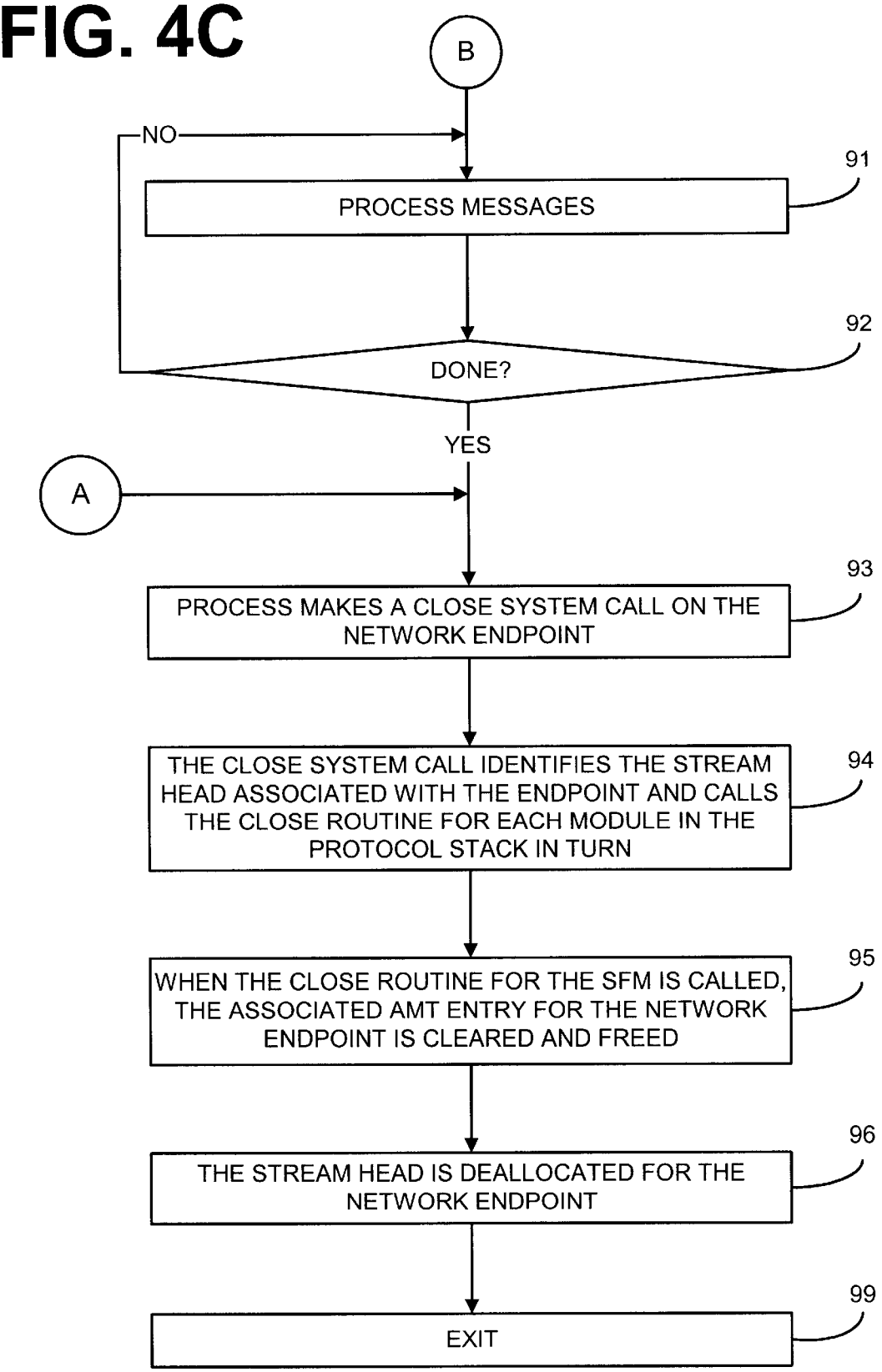

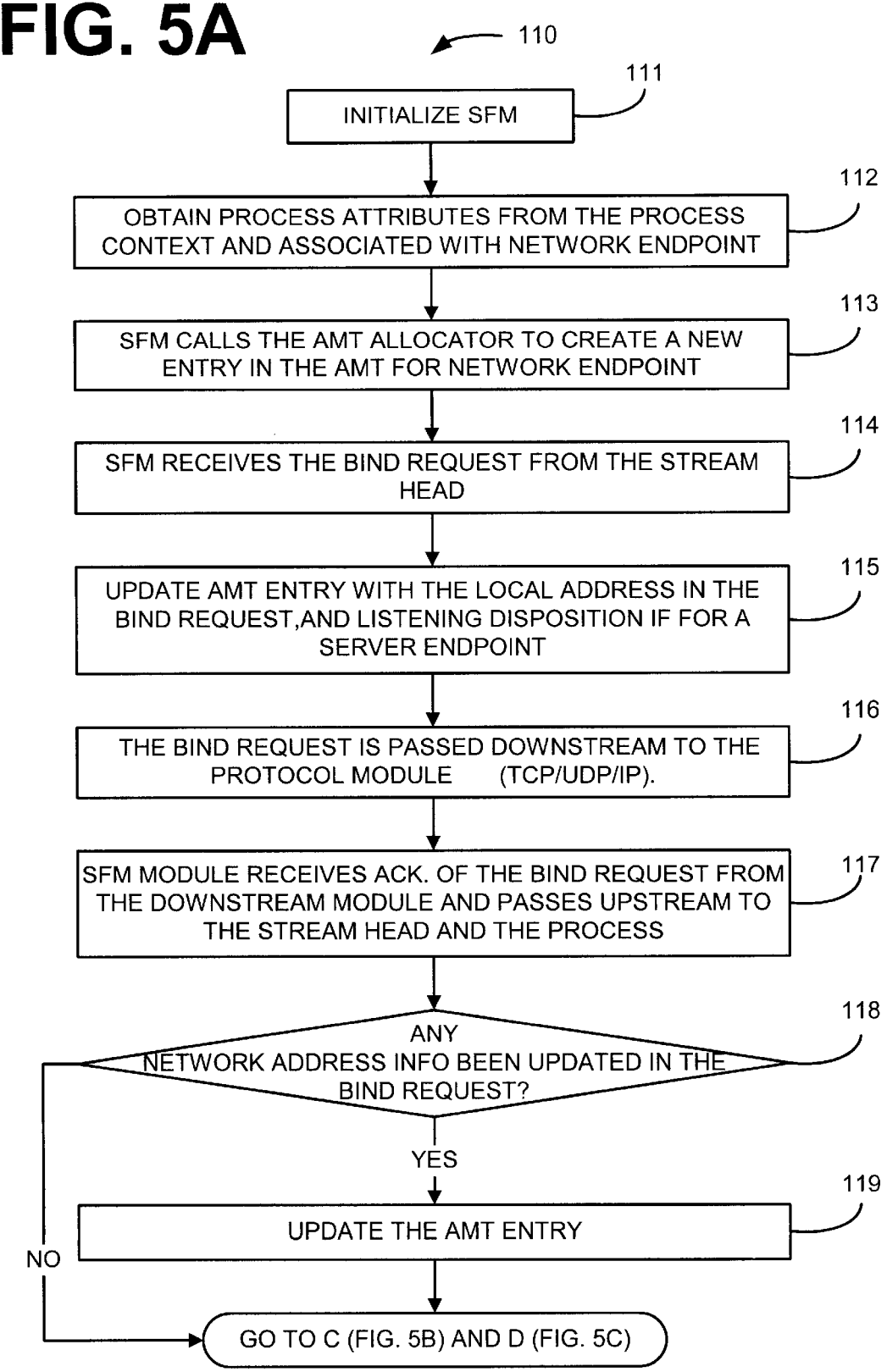

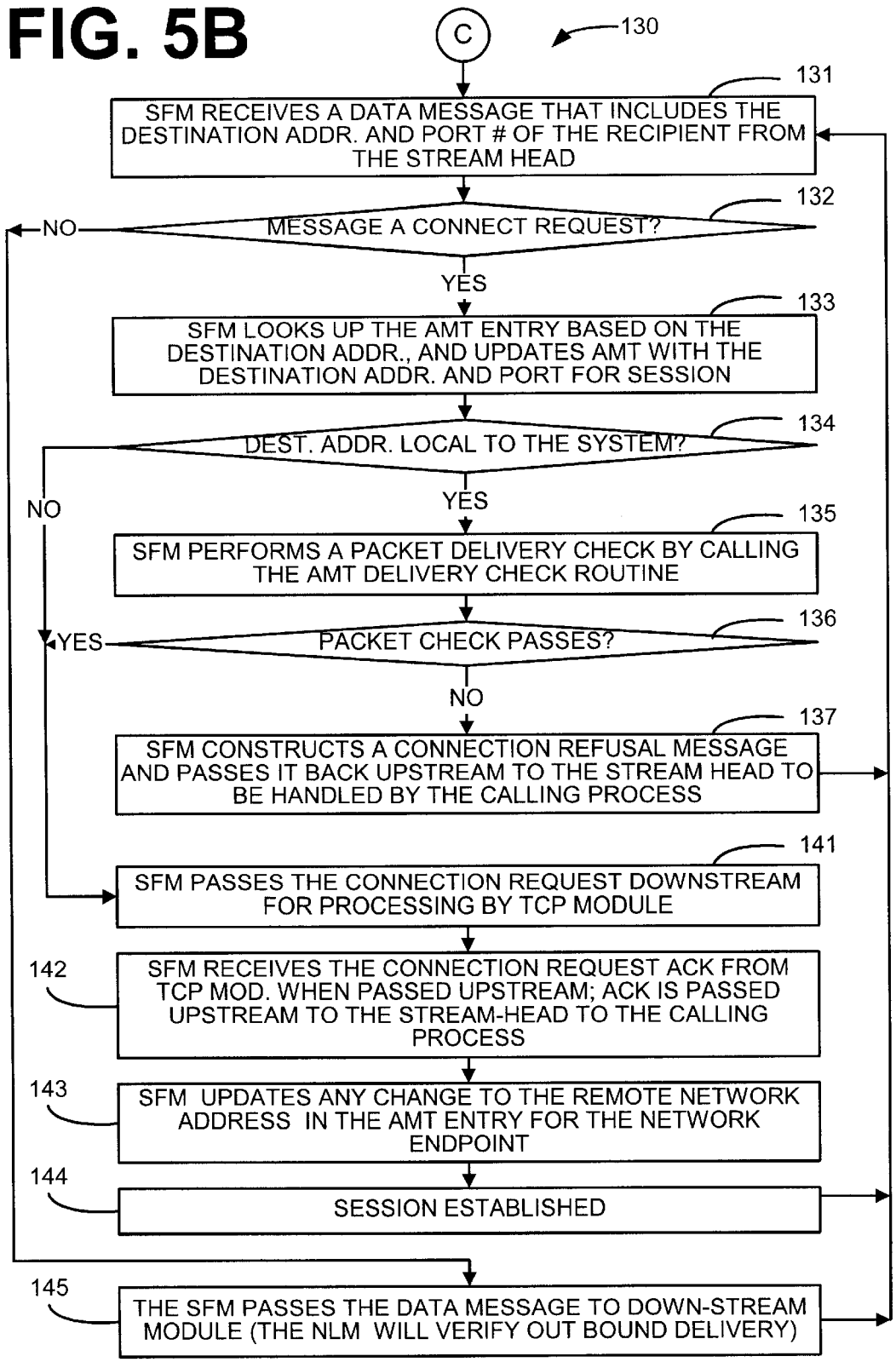

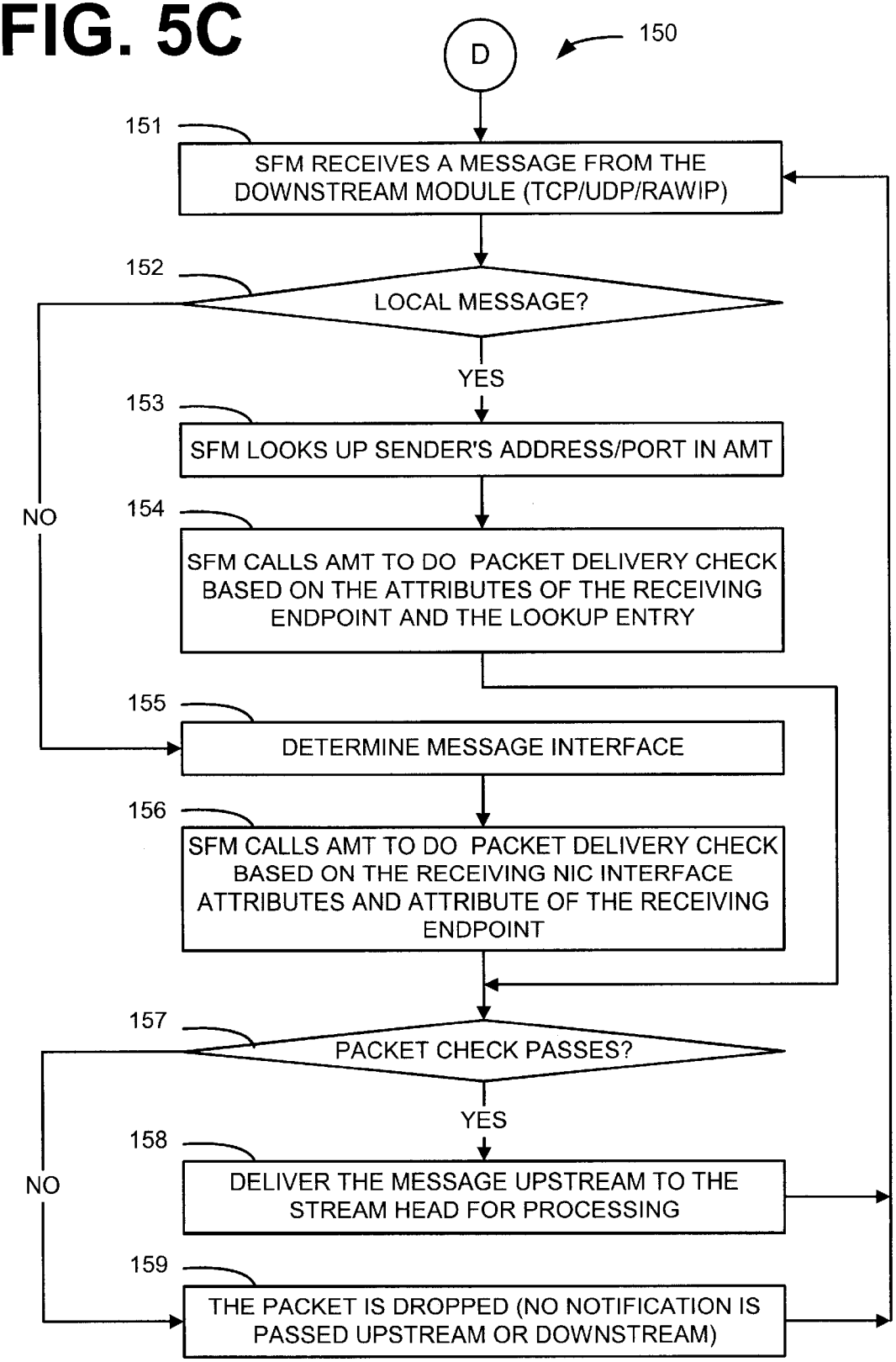

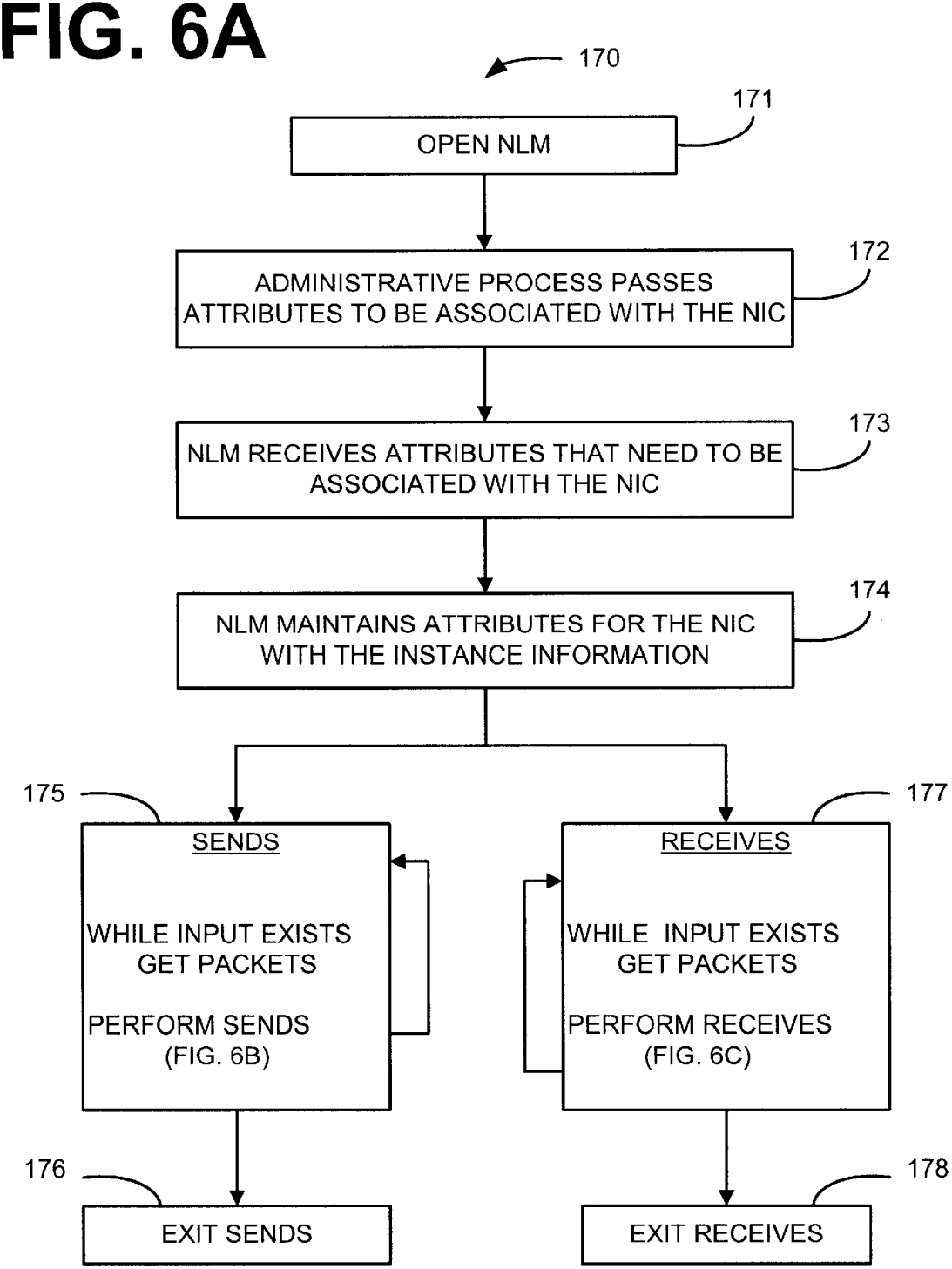

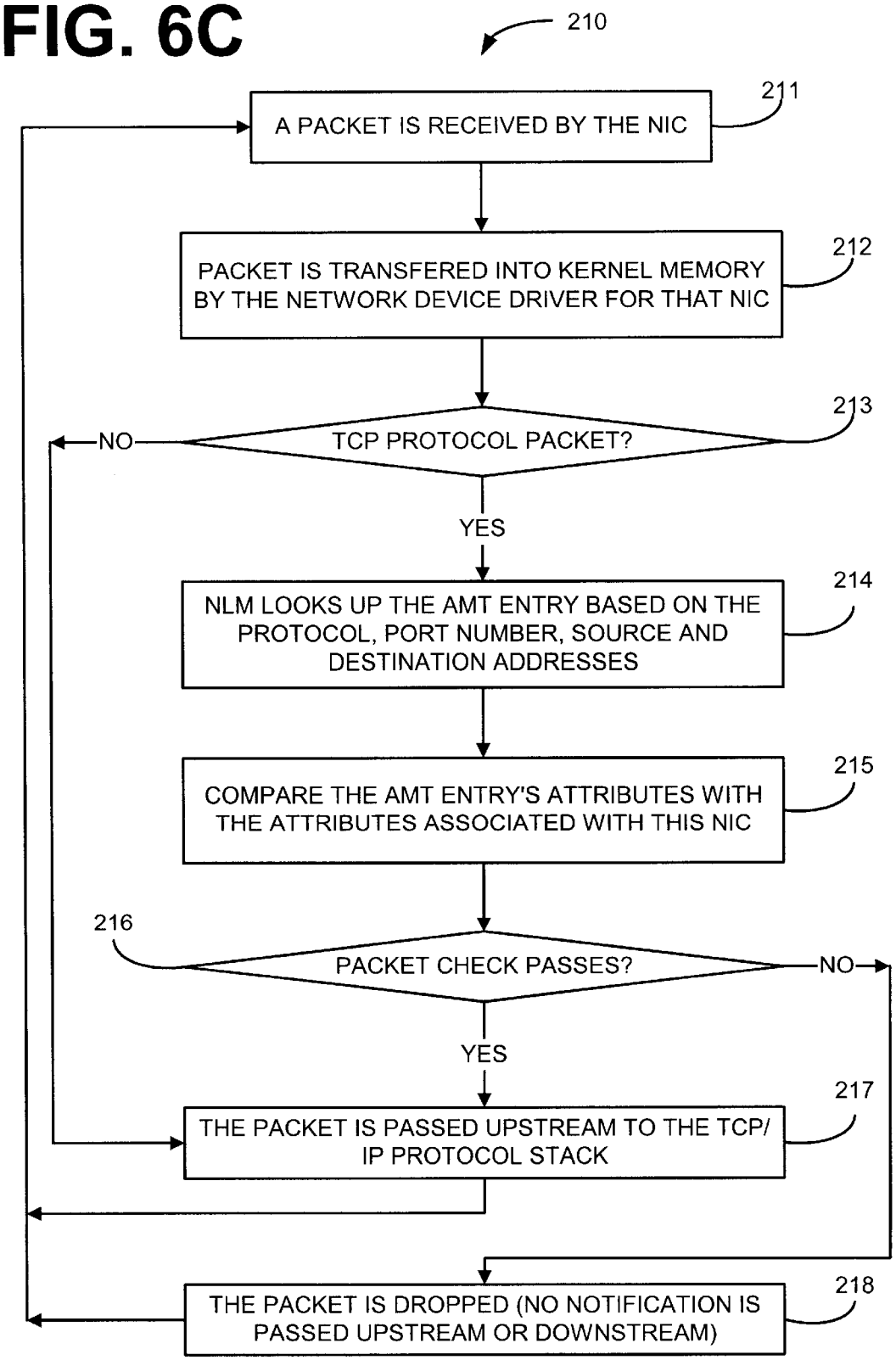

FIG. 7

ATTRIBUTE MAP TABLE — 230

NETWORK ENDPOINT IDENTIFICATION FIELDS
========================================
PROTOCOL
LOCAL PORT
LOCAL ADDRESS
PEER PORT
PEER ADDRESS

ENDPOINT SECURITY ATTRIBUTES
============================
SENSITIVITY LABEL
NETMULTILEVELSERVER PRIVILEGE
ALLOWNETACCESS PRIVILEGE
NETRAWACCESS PRIVILEGE
NETSETID PRIVILEGE
NETPRIVSESSION PRIVILEGE
NETPRIVADOR PRIVILEGE

SESSION FLAGS
=============
CONNECTED FLAG
BOUND FLAG
INDICATOR FLAG
    CLIENT
    SERVER
    LISTEN

NIC ATTRIBUTES
==============
INTERFACE NAME
SENSITIVITY LABEL
HOSTILE INTERFACE FLAG

SYSTEM AND METHOD FOR A STREAMS BASED NETWORK ACCESS CONTROL FOR A COMPUTER

TECHNICAL FIELD

The present invention relates generally to computer systems, and, more particularly, to a system and method for implementing a streams based network access control for a computer.

BACKGROUND OF THE INVENTION

Modern computer systems perform a variety of processing and communication tasks. For example, computers execute application programs such as word processing programs, scheduling programs, design programs, etc. Computers are also used to connect to other computers in order to exchange information. For example, a computer may execute a program that enables the computer to access information stored on other computers. In another example, a computer may execute what is referred to as a "web browser" program in order to access the Internet. The web browser is an application program, similar to that described above, that enables the computer to navigate through the Internet.

When a computer starts an application program, the computer creates what is referred to as a "process" corresponding to the program. The process contains an instance of the application program and a number of attributes that associate the process to the computer user and to other elements associated with the process. For each instance of the program, another process is invoked. Multiple programs having corresponding processes may operate on a computer simultaneously. Furthermore, one application program may have multiple processes running at the same time.

Some processes, such as, for example but not limited to, a word processing program, may interact with files that are stored on the computer that is executing the process, and also may interact with other computers over a network. The network may be a local area network (LAN) or a wide area network (WAN). Such networks allow multiple computers to communicate with each other.

Typically, each process and each file includes a set of attributes, which may determine, for example, access control. For example, a process executing on a computer has a set of attributes assigned, which may determine whether it may access a particular file, which also includes a (generally) different set of attributes. Some of the attributes assigned to the file define the required set of attributes that a process must have in order to access the file. For example in the UNIX operating system, each file includes permission attributes, which specify the owner, group and world (everyone) access to the file. If the file attributes specify that a particular group has "read" and "write" access, but not "execute" access, a process possessing that group in its attribute set will only be able to read and write to the file, but not execute it.

When a process that is executing on a computer wishes to communicate with another computer over a network, the process typically sends and receives messages through a network interface card (NIC) associated with the computer. The NIC connects the computer to a network, to which the other computer is also attached through its own associated NIC.

In some current computer systems, a process executing on a computer has access to and can use all the NICs on the computer. Unfortunately, there is no way to restrict access of a process executing on a computer to one or a set of NICs (and therefore the network to which the NIC is connected) and associated computers.

Thus, a heretofore unaddressed need exists in the industry to address the aforementioned deficiencies and inadequacies.

SUMMARY OF THE INVENTION

The invention provides a system and method for implementing a streams based network access control for a computer. The invention may be conceptualized as a streams based network access control system that includes a software process operating on a computer and having a network endpoint attribute. The software process is configured to communicate a packet through a streams-based network protocol stack to a network interface card that includes an interface attribute. A session filter module and a network filter module are in communication with the network protocol stack. A table of network attributes, associated with the session filter module and network filter module, compares the network endpoint attribute with the interface attribute in the table of network attributes to determine whether the software process can access the network interface card.

The invention may also be conceptualized as a method for a streams based network access control system, the method comprising the steps of: (1) operating a software process, that includes a network endpoint attribute, on a computer; (2) communicating packets through a network protocol stack to a network interface card, where the network interface card includes an interface attribute; (3) establishing an association between the network endpoint attribute and the interface attribute; (4) placing the network endpoint attribute and the interface attribute in a table; (5) comparing the network endpoint attribute with the interface attribute; and (6) determining whether the software process can access the network interface card.

BRIEF DESCRIPTION OF THE DRAWINGS

The present invention, as defined in the claims, can be better understood with reference to the following drawings. The components within the drawings are not necessarily to scale relative to each other, emphasis instead being placed upon clearly illustrating the principles of the present invention.

FIGS. 4A through 4C are flow charts collectively illustrating an example of the operating system kernel, as shown in FIG. 2 and FIG. 3, operating with the streams based network access control system of the present invention.

FIGS. 5A through 5C are flow charts collectively illustrating an example of the session filter module flow in the streams based network access control system of the present invention, as shown in FIG. 2 and FIG. 3.

FIGS. 6A through 6C are flow charts collectively illustrating an example of the network layer module flow in the streams based network access control system illustrated in FIG. 2 and FIG. 3.

FIG. 7 is a block diagram illustrating an example of the attribute map table utilized by the streams based network access control system of the present invention, as shown in FIGS. 2 and 3.

DETAILED DESCRIPTION OF THE PREFERRED EMBODIMENT

Figure 1:
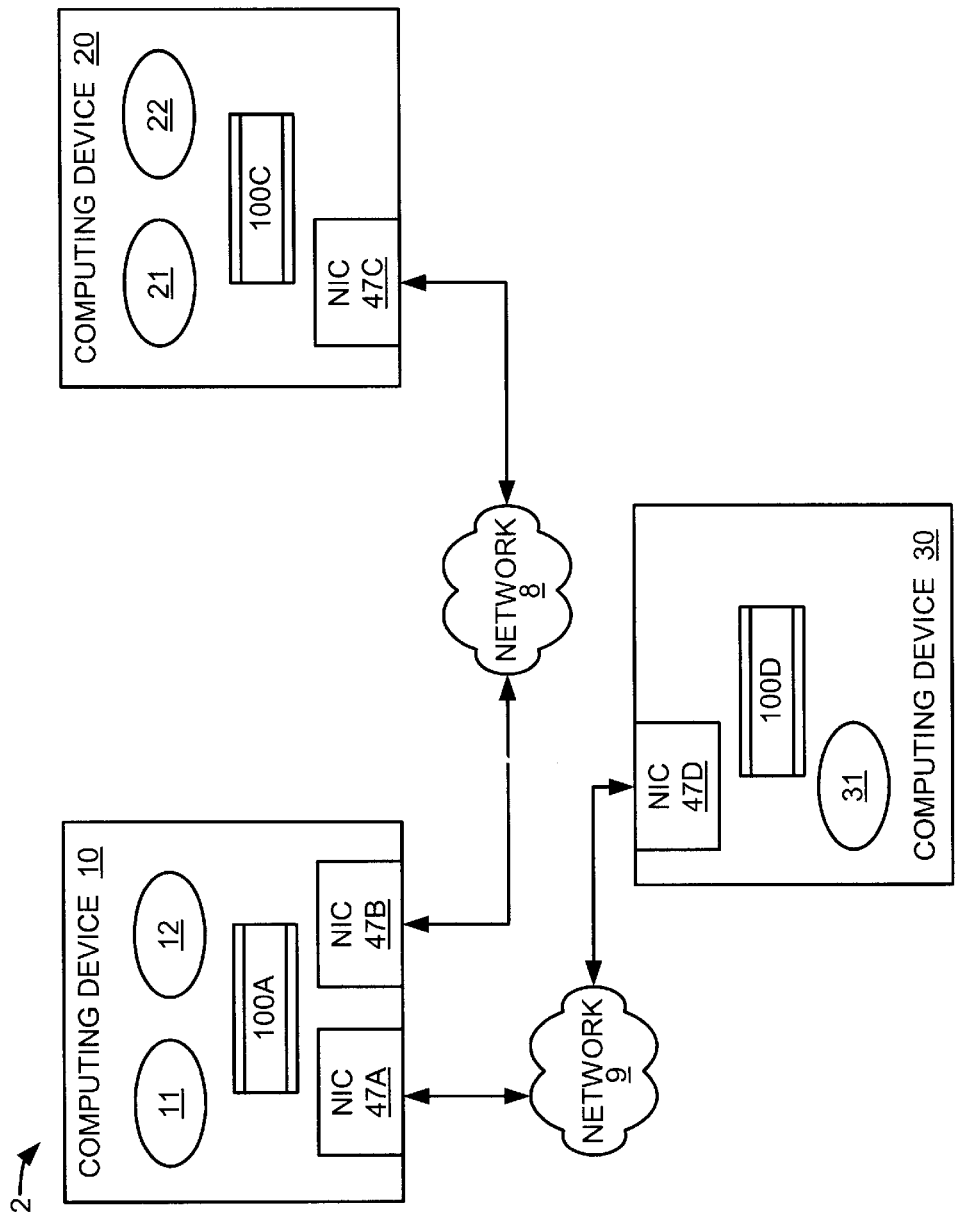
FIG. 1 is a block diagram illustrating the environment in which a computing device including the invention resides.

The invention to be described hereafter is applicable to all computer programs that execute within a discrete, protected domain of execution on a computing device and that have access control, and other attributes. Furthermore, while described below with respect to a single computer, the system and method for a streams based network access control system is typically implemented in a networked computing arrangement in which a number of computing devices communicate over a local area network (LAN), over a wide area network (WAN), or over a combination of both LAN and WAN.

Streams has become the industry standard for implementing network protocols and character device drivers. Under the streams programming model, messages are sent from user applications down the protocol stack. Components, called modules, process these messages. These modules may be pushed and popped from the protocol stack and allow independent modules to perform simple processing on the messages. This model is very different from the sockets based paradigm in that the system is data driven and not demand driven.

Needed is a secure Internet front end with strong host security. The security policies that the network must enforce are information separation and the replacement of root checks (user id zero) with privilege checks. These policies can be enforced, using streams modules, such that the existing technology of the networking layers does not have to be rewritten to accomodate it.

Each network interface is assigned a mandatory access control (MAC) label. Processes which send and receive data on the network interface must reside in the same MAC compartment as that of the network interface or must possess sufficient privilege to override the network security policy decisions.

The description of the present invention includes a description of the TCP/IP protocol stack. These protocols are implemented as streams modules. Data flows between the user process and streams modules that comprise the protocol stack are defined by a set of routines and data structures used to process the data and control information. Data messages are processed by the protocol modules and protocol control information is added to the messages as the messages are sent downstream. Eventually, the data is sent to the remote machine via hardware network interface cards. Similarly, data received from the network is formatted into messages, and sent upstreams to be processed by the protocol modules so as to be in condition to be received by the user process.

By implementing the streams based network access control system of the present invention, it is possible to prevent unprivileged processes from accessing data which originates from a process or network within different MAC partitions via network endpoint communication. The configuration of the network protocol modules must be limited to privileged processes.

What is needed is the ability to allow privileged processes to override certain policies, but these privileges need to be granular enough to prevent misuse by others. There is also a need to limit the ability to use certain privileges such that processes cannot communicate over hostile interfaces. The present invention provides this capability by providing the ability to configure the network interface with the sensitivity label. Next, the network interface is configured as a hostile/non-hostile interface. The administration in the network configuration is then limited to privileged processes. The security attributes MAC label and privilege set associated with an endpoint are stored, and the receipt of packets is filtered by processes based upon at least one security S attribute associated with each network endpoint and each network interface.

In order to provide the capability as defined above, the present invention describes a network layer module (NLM) that maintains a database of network interface security attributes and controls the access to the network interfaces. A session filter module (SFM) maintains a database of network endpoint's security attributes and controls the access to the network endpoints. The database maintained by the NLM and the SFM can be combined into the attribute map table.

The attribute map table includes information about each network endpoint associated with a process, and each network interface. For each network endpoint, this information includes, but is not limited to, the protocol, the local port and address assigned to it, the address and port of the endpoints peer if a session is established, session flags for each endpoint and the security attributes for each endpoint. The session flags include, but are not limited to, a connected flag, a bound flag and an indicator flag. The indicator flag signifies if the session is a client, server or listen type. The endpoint security attributes include, but are not limited to, a sensitivity label, a netmultilevelserver privilege, an allownetaccess privilege, netrawaccess privilege, netsetid privilege, netprivsession privilege and a netprivador privilege. For each network interface, this information includes, but is not limited to, the interface name, the sensitivity label associated with the interface, and the hostile/nonhostile disposition flag of the interface.

Two processes, each running in a different MAC partition, should not be able to share data without the processes involved possessing sufficient privileges. Associated with each network endpoint created on a system are security attributes. These attributes are taken from the process at the time that the endpoint is created. When local communication is attempted, the attributes of the involved endpoints determine whether the communication can proceed.

Extending this concept to network interfaces, a process cannot access a network interface unless it holds the appropriate security attributes. To achieve this functionality, two streams modules are included in the present invention. They are an upper level module and a lower level module. The upper level module "SFM" will monitor the creation of network endpoints and will store the attributes associated with the endpoints in the attribute map table. Any communication between two local endpoints will be filtered by the SFM based upon security attributes associated with the endpoints. This attribute information or endpoint information is accessible by the lower level module "NLM" via access through the attribute map table. The NLM monitors the access to the network interfaces. When a network interface is brought online, the security attributes of the interface are stored in the attribute map table by the network filter module. Any communication between a local endpoint and a network interface is filtered based upon the local endpoint attributes and the attributes associated with the interface as defined in the attribute map table.

Turning now to the drawings, FIG. 1 is a block diagram illustrating a network environment 2 in which a computing device 10, 20 and 30 includes the streams based access control system 100 of the present invention. Network environment 2 includes a plurality of interconnected computing devices 10, 20 and 30, connected by a plurality of networks. As shown in FIG. 1, computing device 10 and computing device 20 are interconnected via network 8. Network 8 may be any communication network, such as a local area network (LAN) or a wide area network (WAN).

Computing device 10 and computing device 30 are interconnected via network 9, which may also be either a LAN or a WAN. Each computing device can be directly connected to at least one network. The computing device 10 uses a network interface card (NIC) 47A to connect to network 9 and an NIC 47B to connect to network 8. Similarly, the computing device 20 is connected to network 8 using a network interface card NIC 47C and the computing device 30 is connected to network 9 via a NIC 47D.

A process 11 associated with an application program (not shown) and executing on computing device 10 can communicate (send and receive data) with a process 31 associated with an application program (not shown) and executing on computing device 30 using NIC 47A. The process 31 uses the network interface card NIC 47D to send and receive packets from process 11. Typically, the computers communicate using TCP/IP to send and receive packets over the network to which they are connected. Thus, process 11 communicates with process 31 by exchanging TCP/IP packets via network 9, by using NIC 47A, and similarly, the process 31 sends and receives TCP/IP packets over network 9, using NIC 47D to communicate with process 11.

In accordance with one aspect of the invention, there may be instances in which it may be necessary, or desirable, to restrict one or more processes executing on a computing device from accessing (i.e. making use of) one or more networks. For example, it may be necessary or desirable, to restrict process 11 from communicating with any peer processes on network 8, but to allow process 11 to communicate with any (all) processes on network 9. This is an example only and is not dependent on the network connectivity shown in FIG. 1. In accordance with an aspect of the invention, and to be described below, the logic of the invention allows each computing device to control which application program executing on the device has access to which of its directly connected networks.

Figure 2:
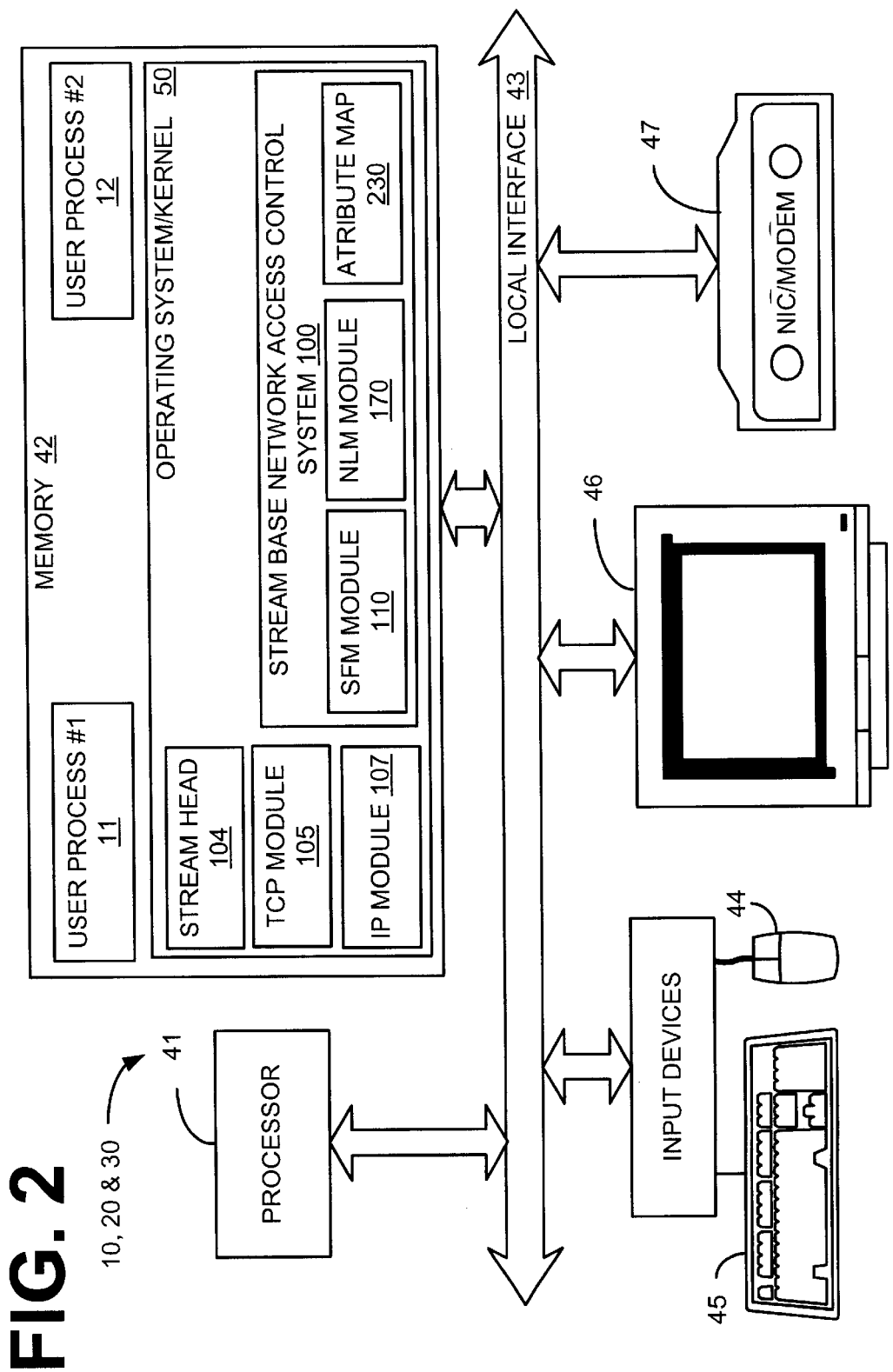
FIG. 2 is a block diagram illustrating an example of a computer system utilizing an operating system with the streams based network access control system of the present invention.

Illustrated in FIG. 2 is an example of computer systems 10–30, which generally comprises a processor 41, and system memory 42 with an operating system kernel 50. The memory 42 includes instructions and data that are executed by the processor 41. The system memory 42 can be either one or a combination of the common types of memory such as for example, but not limited to, erasable programmable read only memory (EPROM), electronically erasable programmable read only memory (EEPROM), flash memory, programmable read only memory (PROM), random access memory (RAM), read only memory (ROM), flash memory, dynamic random access memory (DRAM), static random access memory (SRAM), system memory, or the like. Memory 42 can also include more permanent data storage such as, for example, but not limited to, compact disc read only memory (CD-ROM), disk, diskette, cartridge, cassette, ROM or the like.

The processor 41 accepts program instructions and data from memory 50 over the local interface or bus 43. Direction from the user can be signaled by using an input device(s), for example, a mouse 44, keyboard 45, or the like. The action input and the result output are displayed on the display 46.

The user process 11 and user process 12 are processes running within the computer system 10, 20, and/or 30. The user processes 11 and 12 communicate with each other and other user processes in remote computer systems through the network interface card/modem 47. This communication between user processes 11 and 12 with each other and other user processes in remote systems is accomplished through interaction with the operating system kernel 50 and other modules and data structures used to process and control data messages.

The modules and data structures used to process and control data messages are the streams head 104, TCP module 105, IP module 107, SFM module 110, NLM module 170 and attribute map table 230. The operation of the operating system kernel 50 with regard to the streams based network access control system 100 of the present invention is herein defined in further detail with regard to FIGS. 4A through 4C.

The operation of the session filter module 110 (SFM) in the streams based network access control system 100 of the present invention is herein defined in further detail with regard to FIG. 3 and FIGS. 5A through 5C. The network layer module (NLM) 170 in the streams based network access control system 100 of the present invention is herein defined in further detail with regard to FIG. 3 and FIGS. 6A through 6C. The attribute map table 230 in the streams based network access control system 100 of the present invention is herein defined in further detail with regard to FIG. 3, FIGS. 5A through 5C, FIGS. 6A through 6C and FIG. 7.

Figure 3:
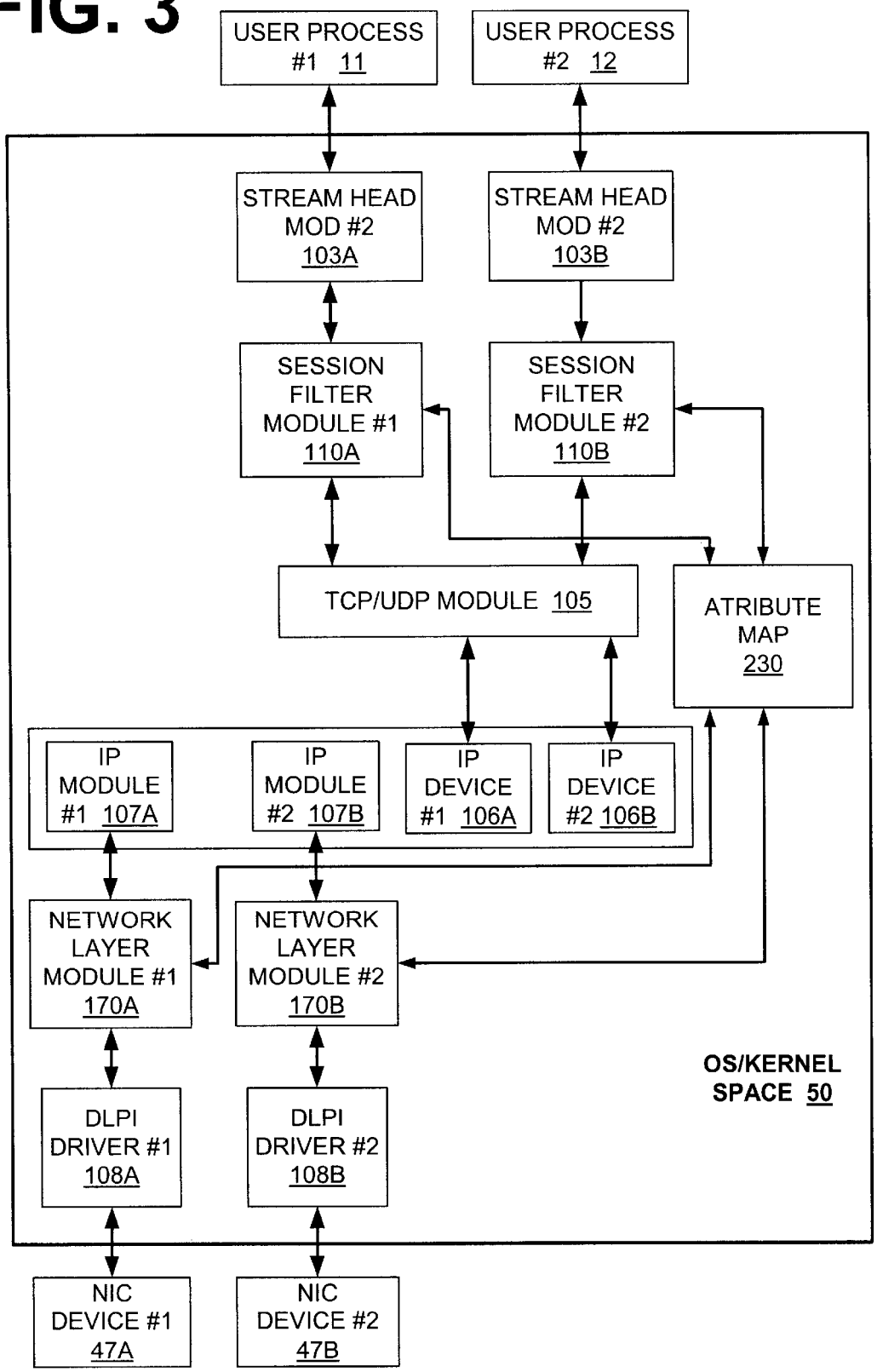
FIG. 3 is a schematic view illustrating the process flow of the streams based network access control system of the present invention, as shown in FIG. 2.

FIG. 3 is a schematic view illustrating the process flow of the streams based network access control system 100 of the present invention. When a program is executed, the operating system kernel 50 creates a process. For example, process 11 could be a process of a "web server" application program and process 12 could be a process of a "document editing" application program, such as a word processing program. The process 11 has a set of attributes associated with it, some of which are derived from the user invoking the program and others derived from the program itself. A few examples of these attributes are user ID, network end point IDs and security attributes. These attributes will be herein discussed in detail with regard to the attribute map table 230 (FIG. 7). Although logically associated and connected with the process itself, these attributes are created and maintained by the operating system kernel 50, SFM 110 and NLM 170 using the attribute map table 230.

The session filter module (SFM) 110 is responsible for assigning and maintaining attributes on network endpoints, as well as controlling access between endpoints during local-to-local communication. The attributes associated with a network endpoint consist of the compartment label associated with the process, as well as a representation of relevant privileges in effect, when the endpoint is created. When packets are sent between local endpoints, the receiving endpoint compares its attributes with its peer endpoint's attributes. A satisfactory attribute comparison allows the data to be delivered, whereas a failed comparison causes the data transfer to be aborted.

The SFM 110 takes advantage of the autopush( ) feature of streams to cause the module to be loaded between the streams head and each instance of TCP, UDP, and raw IP modules. This occurs whenever a process calls socket( ) or open( ) to establish a network endpoint. The first time that this gets done is by the modified command ifconfig, which must provide the SFM 110 with each IP address to be associated with the local host (since there is no direct access to the routing tables from this level). This list of addresses is maintained in the attribute map table 230 and used for determining which communications between endpoints are locally bound (i.e. the same local system) versus off-the-box (i.e. a remote system).

As a streams module, the SFM 110 associates the attribute map table 230 structure with its read/write queue pair. This attribute map table structure includes, but is not limited to, the following information:

Transport protocol

Source IP address and port

Peer IP address and port

Endpoint security attributes (includes compartment label and privilege attributes)

CLIENT, SERVER, or LISTEN flag indicator (for TCP)

CONNECTED, BOUND flag indicator (for UDP)

This information is filled in as it is available on or after the initial endpoint creation. When the endpoint is first created, the operating system kernel 50 is in the context of the calling process. At this time, the endpoint attributes are copied into the attribute map table 230 of the newly allocated queue instance. Because the transport must be defined when the endpoint is created, this information is also stored. As a special case, if one of the endpoint attributes is NETMULTILEVELSERVER, the label associated with the endpoint is stored as WILDCARD. The remaining information is provided based upon the transport type. Fortunately, when an endpoint is destroyed (via a close( )), all information pertaining to the endpoint can be discarded. This is because packets containing data will not be accepted by any transport module without an upstreams module to deliver the packets to. Also, the network filter module 170 will not allow packets to be delivered upstreams if an endpoint lookup fails.

Because TCP is a session based protocol, an endpoint can be established as a SERVER (listening) type endpoint, or a CLIENT (connecting) type endpoint. In either case, a BIND request must be made to establish the identity of the local endpoint's port. The bind request may also include the local IP address to associate with the endpoint, or it can remain unspecified. The information provided in the BIND request is copied into the source address and port field of the attribute map table. If the BIND request indicates a listen queue size, the SERVER flag indicator must be set in the attribute map table. Otherwise, the CLIENT flat is set.

Note that many TCP client endpoints do not bother to bind a local port before attempting to connect to a peer. The session filter module intercepts these autobind attempts and forces an explicit BIND request using port 0. This causes TCP to assign a dynamic port number and return the port number upstreams so that it can be recorded at the streams head 103. This information will also be stored in the attribute map table 230.

The peer address that gets associated with an endpoint can be initiated in one of two ways. The simplest method occurs when a connect request is performed on an endpoint. The requested peer's IP address and port are taken directly from the CONNECT request and copied into the peer address and port fields of the attribute map table. The more complex method occurs when the endpoint is a SERVER type endpoint, and there are two types of SERVER endpoints. If an endpoint is going to accept a connection without creating a new accepting endpoint, it is a true SERVER endpoint. The endpoint instance gets used directly for the established connection. Otherwise, it is considered a LISTEN endpoint. A listen endpoint will never have a peer endpoint associated with it. When a CONNECT indication is received by a LISTEN endpoint, a new endpoint gets created with an entirely new streams head context. At this time, the peer information is sent upstreams to the new streams head. This peer information must then get copied into the new attribute map table instance, along with all the related information from the listening endpoint's attribute map table.

Since UDP is not a session based protocol, the indicator flag has no meaning for this transport type. Any outbound packet from a UDP endpoint is treated as a CLIENT type. Any inbound packet to a UDP endpoint is treated as a SERVER type. When an endpoint is created, the attributes are copied into the attribute map table 230 of the newly allocated endpoint. When the endpoint is bound, the local address and port are copied into the attribute map table 230 and the flag indicator is set to BOUND. If a CONNECT request is performed on a UDP endpoint, the peer address and port are copied into the peer address and port fields of the attribute map table 230 and the flag indicator is set to CONNECTED. IF a UNITDATA request is passed down and a destination address is provided (via sendto( )), copy the destination address into the peer address and port fields of the attribute map table 230.

When either the network filter module 170 or the SFM 110 receive a packet, a lookup must be performed to determine the peer endpoint. In the prefered embodiment, this lookup is performed by providing the following information with regard to the endpoint whose attributes are desired:

the transport protocol the IP address and port of the endpoint the IP address and port of the endpoint's peer whether the endpoint is considered the CLIENT or the SERVER of the transaction The structures in the attribute map table 230 are hashed based on the endpoint protocol and port number. When an endpoint lookup function is called, there should be only one suitable endpoint that maps to the specified source/destination requested. Because endpoint lookups for TCP packets are limited to connection initiation only, all of the endpoints that have already been established as connected are not eligible to be returned by the lookup.

The network filter module (NLM) 170 is responsible for controlling access to the network interface(s) 47. The network interfaces 47 are labeled with a set of attributes when the interface is brought on-line. When data is sent or received on the network interface(s) 47, the attributes of the interface are compared with the attributes of the endpoint receiving or sending the data. If the attributes specify that the communication is not allowed, the data is either dropped or an error is returned.

The NLM 170 is configured by ifconfig(1M). There is an instance of the NLM 170 for each network interface 47 on the system. The NLM 170 is pushed between the IP module 107 and the DLPI drivers 108. Data received by the NLM 170 comes directly from either the IP module 107 (outbound) or DLPI driver 108 (inbound).

On receipt of a packet from the DLPI driver 108, the NLM 170 determines whether the packet contains user data. If the packet does not contain user data it is passed upstreams unfiltered. If the packet contains user data, NLM 170 parses the packet to determine the protocol of the packet. If the protocol is being filtered, the source and destination addresses are retrieved from the packet. These addresses are looked up in the attribute mapping table 230 to determine the attributes of the receiving endpoint. The attributes of the endpoint are compared against those of the interface 47. If the attributes permit receipt of the packet, the packet continues upstream. If not, the packet is discarded.

If none of the above are true, the packet is discarded. A packet not destined for a local endpoint is discarded. Thus, there is no mechanism for doing IP forwarding.

TCP packets are filtered by NLM 170 but handled a little differently than the generic packets. Once the packet is determined to be TCP, the packet type is extracted. If the packet represents a connection establishment packet, the packet's source and destination address are extracted and looked up in the endpoint attribute mapping table 230. The mapping entry returned is used to determine whether the packet is received or discarded. If none of the criteria enumerated above are met, the packet is dropped. Otherwise, the packet is sent upstream.

If the packet does not represent a connection establishment packet, it is sent upstreams unfiltered. Once the connection is established, there is no reason to continue checking each packet from the same connection since the attributes will remain unchanged for the duration of the connection. If a packet arrives for which there is no established connection, TCP will discard it.

All inbound UDP messages are passed unfiltered upstreams for the SFM 110 to filter. A process needs the NETRAWACCESS privilege to use a raw socket. Once created, the process can receive or send to any interface 47. Raw packets are not filtered by the NLM 170.

On receipt of a packet from the IP module 107, the NLM 170 determines whether the packet contains user data. If the packet does not contain user data it is passed downstreams unfiltered. If the packet contains user data, NLM 170 parses the packet to determine the protocol of the packet. If the protocol is being filtered, the source and destination addresses are retrieved from the packet. These addressed are looked up in the attribute mapping table 230 to determine the attributes of the sending endpoint. The attributes of the endpoint are compared against those of the interface 47. If the attributes permit export of the packet, the message containing the packet is forwarded downstream. If not, the message is discarded.

Illustrated in FIGS. 4A through 4C is the operation of the operating system kernel 50 with regard to the session filter monitor (SFM) 110, network layer module (NLM) 170 and the attribute map table 230 in the streams access control system 100 of the present invention. First, at step 51, the operating system kernel 50 is initialized. Next, at step 52, the operating system kernel 50 performs the open routine for the NLM 170 on top of each instance of DLPI driver 108 for each network interface card 47 on the computer system 10 (FIG. 2).

At step 53, the operating system kernel 50 then passes the attributes associated with the network interface card 47 to the NLM 170. The NLM 170 then maintains the attributes for the network interface card 47 within the attribute mapping table 230 that is herein defined in further detail with regard to FIG. 7. In an alternative embodiment, the attributes of the network interface card 47 are maintained within a private data area of the NLM 170.

Next, at step 54, the operating system kernel 50 receives a system call from a user process 11 or 12 (FIGS. 1 and 2) to establish a new network endpoint. Next, the operating system kernel 50 creates and initializes a new streams head instance at step 55. At this time, the operating system kernel 50 creates a streams head module 103. At step 56, the operating system kernel 50 then performs the open routine for each streams module in the protocol stack, which takes place in a process context. The operating system kernel 50 then calls an open routine to initialize the SFM 110 to establish a new network endpoint at step 57.

At step 61, the operating system kernel 50 receives a system call from the user process 11 or 12 (FIGS. 1 and 2) to bind a network address to the local network endpoint created in step 57. At step 62, the bind request received at step 61 is passed down the protocol stack via the streams head 103. At step 63, the process bind acknowledgement is then passed back to the user process 11 or 12 (FIGS. 1 and 2). At this point, the endpoint is now initialized for communication for further processing. At this time, the operating system kernel 50 continues processing with the endpoint that was initialized at steps 54 through 64. The operating system kernel 50 also returns to step 54 to wait to receive the next system call from a user process 11 or 12 (FIGS. 1 and 2), to establish another network endpoint.

Illustrated in FIG. 4B are the steps for the processing of communication with the endpoint established in steps 54 through 64. At step 71, the operating system kernel 50 determines whether the user process 11 or 12 (FIGS. 1 and 2) is establishing a session. If it is determined at step 71 that a session is not being established, the operating system kernel 50 then skips to step 77. However, if it is determined at step 71 that the user process 11 or 12 (FIGS. 1 and 2) is establishing a session, the operating system kernel 50 establishes a session for exchanging data with another network endpoint. The exchanging of data with another network endpoint is initiated by a connection to a server with a connect system call or connect indication from a network interface card 47 that includes the destination address and port number of the recipient at step 72. At step 73, the operating system kernel 50 then sends up or down the protocol stack a connect request via the streams head 103 or the TCP module 105. At step 74, the addressing of the connection is evaluated to determine whether the communication between endpoints should be allowed.

At step 75, the operating system kernel 50 then determines whether the evaluation performed at step 74 that the communication is to be allowed. If the operating system kernel 50 determines that the communication is not to be allowed, the operating system kernel 50 then skips to step 93 (FIG. 4C) to close the network endpoint denied communication. However, if it is determined at step 75 that communication is allowed, the operating system kernel 50 then allows data to pass normally over the connection at step 76. The operating system kernel 50 then proceeds to process the messages, as herein defined in further detail with regard to FIG. 4C.

At step 77, the operating system kernel 50 determines whether or not the process has an established session and whether the process is sending discreet messages. If it is determined at step 77 that the process is not sending discreet messages, the operating system kernel 50 then proceeds to FIG. 4C to process the messages at step 93. However, if it is determined at step 77 that the process is sending discreet messages, the operating system kernel 50 then sends this message down the protocol stack via the streams head 103 to be processed without establishing a communication session. The operating system kernel 50 then makes a system call to send a message that includes the destination address of the recipient.

Illustrated in step 4C is the processing of messages and closing of the network endpoint. At step 91, the communication messages are processed. At step 92, the operating system kernel 50 then determines whether it is done processing messages for a particular communication endpoint. If it is determined at step 92 that there are more messages to be processed for a particular destination endpoint, the operating system kernel 50 then returns to repeat steps 91 and 92.

However, if it is determined at step 92 that there are not more messages to be processed for a particular endpoint, the operating system kernel 50 then proceeds to step 93 to close the network endpoint.

At step 93, the operating system kernel 50 then makes a close system call for the network endpoint to be closed. At step 94, the close system call identifies the streams head 103 associated with the endpoint to be closed and calls the close routine for each module in the protocol stack in turn at step 94. At step 95, the operating system kernel 50 then determines when the close routine for the SFM 110 is called and clears and frees the entry in the associated attribute mapping table 230 for the network endpoint at step 95. At step 96, the operating system kernel 50 then deallocates the streams head 103 for the particular endpoint and exits at step 99.

Illustrated in FIGS. 5A through 5C are flow charts collectively illustrating an example of the session filter module flow (SFM) 110 in the streams based network access control system 100 of the present, as shown in FIGS. 2 and 3 above. The SFM 110 is a streams module that is intended to sit directly below the streams head 103 (FIG. 3), in a TCP/IP networking protocol stack. One of the downstreams modules that the SFM 110 is expected to communicate with is one or more TCP/UDP module 105, or raw IP module 107 in the TCP/IP networking protocol stack. The SFM 110 is responsible for creating and maintaining the attribute map table 230 (FIGS. 2 and 3). It is assumed that the downstreams IP module 107 has a means for communicating the true destination address of an incoming data packet as well as the interface ID through which the packet is delivered. In this example, IP options can be negotiated to have this information passed upstreams when the connection indications are received. The configurations of the system networks interfaces are also assumed to be accessible to the SFM 110.

First, the SFM 110 is initialized at step 111. At step 112, the SFM 110 obtains process attributes from the process context and associates them with a network endpoint. The SFM 110 then calls the allocater for the attribute map table 230 to create a new entry in the attribute map table 230 for the network endpoint at step 113. At step 114, the SFM 110 receives a bind request from the streams head 103 (FIGS. 2 and 3). Next, at step 115, the SFM 110 updates the entry in the attribute map table 230 with the local address that was in the bind request. The SFM 110 also notes in the attribute map table 230 whether the local endpoint is designated as a listening endpoint for a network server.

Next, at step 116, the SFM 110 passes the bind request downstreams to the TCP/UDP module 105 (FIGS. 2 and 3). The SFM 110 then waits to receive an acknowledgement of the bind request from the downstreams TCP/UDP module 105, at step 117. After receiving the acknowledgement of the bind request from the downstreams TCP/UDP module 105, the SFM 110 then passes the acknowledgement upstreams to the streams head 103 (FIGS. 2 and 3) and the user process 11 or 12 (FIGS. 1 through 3).

At step 118, the SFM 110 then determines whether any network address information has been updated in the bind request received from the downstreams TCP/UDP module 105. If it is determined at step 118 that any network information has been updated in the bind request received from the downstreams TCP/UDP module 105, the SFM 110 then updates the entry in the attribute map table 230, at step 231. After updating the attribute map table 230, the SFM 110 then proceeds to receive upstreams and downstreams data as illustrated in FIGS. 5B and 5C.

Illustrated in FIG. 5B is the send process 130 in the SFM 110. A communication via a network endpoint through the SFM 110 can occur in the following ways. First, a user process 11 can establish a session for exchanging data with another network endpoint (i.e., a server) by initiating a connection to that server. The address of the connection is evaluated to determine whether the communication between the endpoint should be allowed. If the session between the client and server is established, data may pass normally over the connection. Otherwise, a process can send discreet messages to a receiving network endpoint without having to establish a session with a particular network endpoint first. Each message must be addressed and independently evaluated to determine whether the delivery should be allowed. The send process 130 in the SFM 110 implements both of these methods for sending data messages, as follows.

At step 131, the send process 130 in the SFM 110 receives a data message that includes a destination address and a port number of a recipient from the streams head module 103 (FIGS. 2 and 3). After receiving the data message, the send process 130 in the SFM 110 then determines whether the message is a connect request at step 132. If it is determined at step 132 that the message is not a connect request, the send process 130 in the SFM 110 then proceeds to step 145. However, if it is determined at step 132 that the message received at step 131 is a connect request, then the SFM 110 looks up the destination address and port number as an entry in the attribute map table 230, at step 133. The SFM 110 updates the attribute mapping table 230 with the destination address and port number for the session.

At step 134, the send process 130 in the SFM 110 determines whether the destination address is local to the computer system 10 (FIG. 1 and FIG. 2). If it is determined at step 134 that the destination address of the data message is not local to the system, the send process 130 in the SFM 110 then skips to step 141. However, if it is determined at step 134 that the destination address of the data message is local to the system 10, the send process 130 in the SFM 110 then performs a packet delivery check by calling the attribute map table delivery check routine at step 135.

The local TCP delivery check is made by comparing the attributes of the peer endpoint with those attributes of the endpoint initiating the connection. If the compartment labels of the two endpoints match, the check passes. If the compartment labels do not match, but the receiving endpoint possesses the allownetaccess privilege, the check passes. If the compartment labels do not match and the receiving endpoint possesses the netmultilevelserver privilege, the check passes. If the compartment labels do not match and the receiving endpoint possesses the netmultilevelserver privilege and the netsetid privilege and the connecting endpoint possesses the netprivsession privilege, the check passes. Otherwise the check fails.

At step 136, the send process 130 in the SFM 110 then determines whether the packet check passes. If it is determined at step 136 that the packet check did pass, the send process 130 then skips to step 141. However, if it is determined at step 136 that the packet did not pass the check, the send process 130 constructs a connection refusal message and passes it back upstreams to the streams head 103 (FIGS. 2 and 3) to be handled by the calling user process. The send process 130 in the SFM 110 then returns to step 131 to receive the next data message.

At step 141, the send process 130 in the SFM 110 passes a connection request downstreams to the TCP/UDP module 105 for processing. At step 142, the send process 130 waits to receive a connection request acknowledgement from the TCP/UDP module 105 when it is passed upstream. When the acknowledgement is received at step 142, the send process 130 in the SFM 110 then passes the connect request acknowledgement upstreams to the streams head 103, which then passes the connection acknowledgement back to the calling user process. At step 143, the SFM 110 updates any changes to the remote network address in the attribute mapping table 230 for the appropriate network endpoint. At step 144, the send process 130 in the SFM 110 acknowledges that the session has been established and returns to step 131 for further data message processing.

At step 145, the send process 130 in the SFM 110 passes the data message received at step 131 to the downstreams TCP/UDP module 105. The SFM 110 is counting on the NLM 170 or the SFM 110, at step 151, to verify the delivery of this type of data message. The send process 130 in the SFM 110 then returns to repeat step 131 through 145.

Illustrated in FIG. 5C is the receiving process 150 functionality of the SFM 110. Communication via network endpoint acting as a server (i.e., a receiver) begins by the receipt of a message from a client or sender. This message may take the form of a session initialization request (a connection), or as a stand alone datagram message. In either case, delivery of the data message is validated based upon the attributes associated with the receiving endpoint and the endpoint of the originator of the message.

The first step in the receive process 150 is receiving a message from a downstreams module TCP/UDP 105 at step 151. Next, at step 152, the receive process 150 in the SFM 110 determines whether the message is a local message. If it is determined at step 152 that the message received at step 151 is not a local message, the receive process 150 in the SFM 110 then skips to step 155. However, if it is determined at step 152 that the message received is a local message, the receive process 150 in the SFM 110 then looks up the sender's address and port in the attribute map table 230. At step 154, the receive process 150 in the SFM 110 calls the attribute map table 230 to do a packet delivery check based upon the attributes of the receiving endpoint and the lookup entry. The receive process 150 of the SFM 110 then proceeds to step 157.

At step 155, the receive process 150 determines the message interface. At step 156, the receive process 150 in the SFM 110 calls the attribute map table 230 to do a packet delivery check based upon the interface attributes for the receiving network interface 47 and the attributes of the receiving endpoint.

At step 157, the receive process 150 in the SFM 110 then determines whether the packet check passes. If the packet check does not pass, the receive process 150 then proceeds to step 159 where the packet is dropped and no notification is passed either upstreams or downstream. The receive process 150 in the SFM 110 then returns to repeat steps 151 through 159. However, if it is determined at step 157 that the packet check did pass, the receive process 150 in the SFM 110 delivers the message upstreams to the streams head 103 (FIGS. 2 and 3) for further processing. The receive process 150 in the SFM 110 then returns to repeat steps 151 through 159.

Figure 6B:
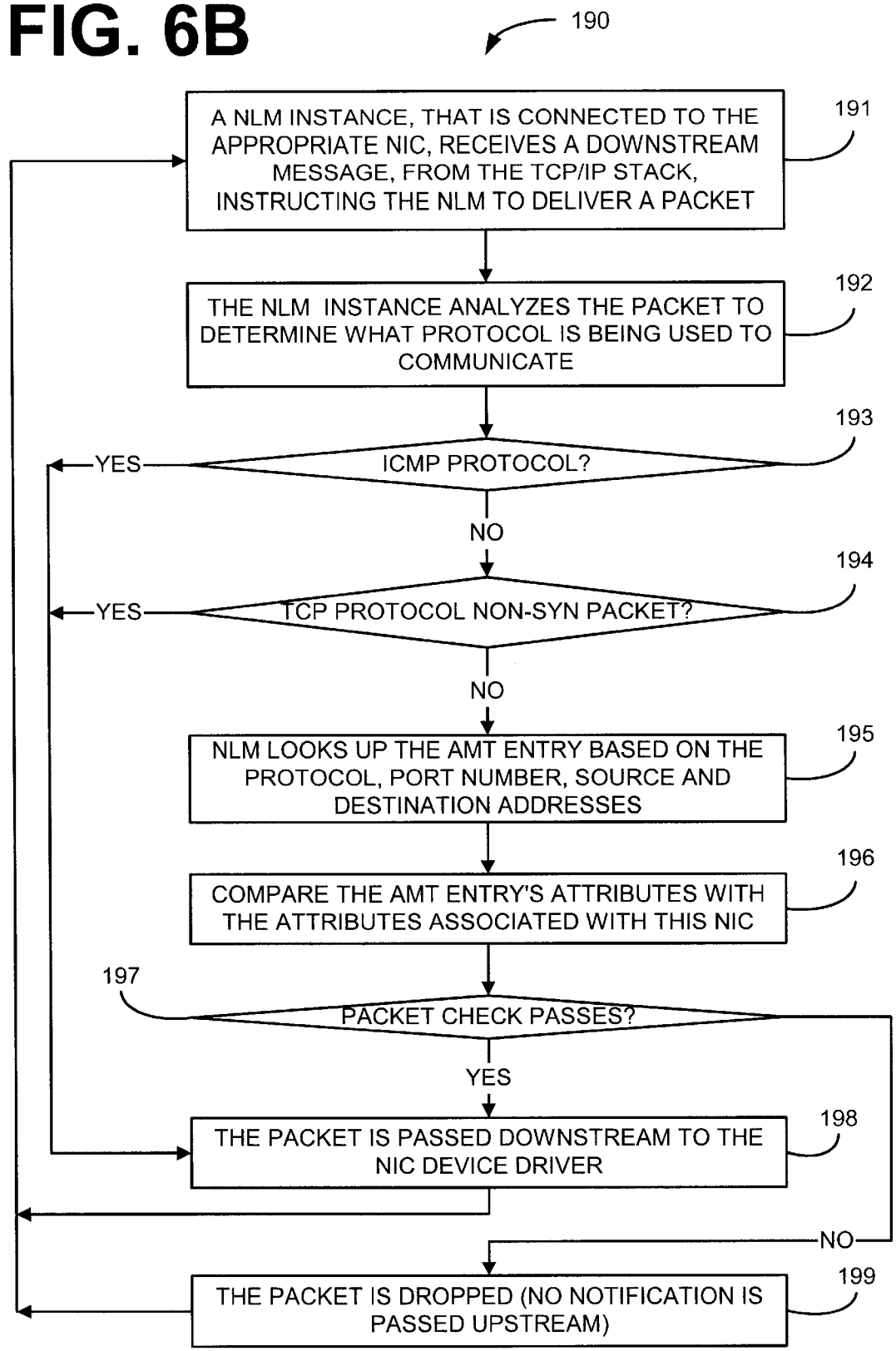

Illustrated in FIGS. 6A through 6C are flow charts collectively illustrating an example of the network layer module (NLM) 170 flow in the streams based network access control system illustrated in FIGS. 2 and 3 above.

The network layer module 170 (NLM) is a streams module that is intended to sit below the TCP/IP protocol stack, and more specifically, the IP module 107. The NLM 170 also communicates with the DLPI driver 108 that transfer network packets to and from the network interface cards 47 (NIC). The NLM 170 queries the attribute map table 230 when making packet delivery decisions for inbound and outbound packets.

The NLM 170 needs to be initialized only once for each NIC 47 configured on the computer system 10. An administrative process pushes the NLM 170 on top of each instance of the DLPI driver 108 for each network interface NIC 47 on the computer system 10. When the NLM 170 is pushed, its open routine is called. Attributes that need to be associated with the NIC 47 are passed to the NLM 170, where they are maintained with the instance information. This information varies depending on what type of attributes are available for the platform. In the streams model, the attributes stored are the sensitivity label assigned to the NIC 47 and a flag that denotes whether the interface is considered hostile or not. A hostile interface is one through which an attacker may gain access to the computer system 10. In an alternative embodiment, the attributes maintained with the NLM 170 instant information can be alternatively stored in the attribute map table 230.

First, the NLM 170 is opened at step 171. Next, at step 172, an administrative process passes attributes to be associated with the NIC 47. Further, at step 173, the NLM 170 receives the attributes that need to be associated with the NIC 47. At step 174, the NLM 170 maintains the attributes for the NIC 47 within the attribute map table 230. In an alternative embodiment, the NLM 170 may store the attributes for the NIC 47 within its own instance information.

Next, the NLM 170 performs both the send and receive operations. At step 175, the NLM 170 continues to send data packets while input of data packets exist. The send process 190 is herein defined in further detail with regard to FIG. 6B. When packets data messages do not exist, the NLM 170 then exits the send process at step 176.

At step 177, the NLM 170 receives packets. The receive packet process 210 is herein defined in further detail with regard to FIG. 6C. After receiving all existing data packets, the NLM 170 then exits the receive process at step 178.

Illustrated in FIG. 6B is the send packet process 190 of the NLM 170. First, the NLM 170 that is connected to an appropriate NIC 47 receives a downstreams message from the TCP/IP stack from the IP device 106. This downstreams message instructs the NLM 170 to deliver a packet. At step 192, the send packet process 190 of the NLM 170 analyzes the data packet to determine what protocol is being used to communicate. At step 193, the send packet process 190 determines whether the protocol is an ICMP protocol. It is determined at step 193 that the protocol is an ICMP protocol, the send packet process 190 of the NLM 170 then skips to step 198. However, if it is determined at step 193 that the data packet is not utilizing an ICMP protocol, the send packet process 190 of the NLM 170 then determines whether the data message is a TCP protocol non-syn packet at step 194.

If it is determined that the packet is a TCP protocol non-syn packet at step 194, the send packet process 190 of the NLM 170 then skips to step 198. However, if it is determined at step 194 that the downstreams message a TCP protocol non-syn packet, the send packet process 190 of the NLM 170 then looks up an entry in the attribute map table 230 based upon the protocol port number source and destination address for the downstreams message at step 195. At step 196, the send packet process 190 compares the entry attributes in the attribute map table 230 with the attributes associated with the NIC 47.

At step 197, the send packet process 190 of the NLM 170 determines whether the packet passes the check. If it is determined at step 197 that the packet does not pass the check, the send packet process 190 of the NIC 170 then skips to step 199. However, if it is determined at step 197 that the packet does pass the check, the packet is then passed downstreams to the NIC device driver 108, at step 198. After passing the packet downstreams to the NIC device driver 108, the send process 190 in the NLM 170 then returns to receive and process the next downstreams packet at step 191.

However, if it is determined at step 197 that the packet check does not pass, the downstreams packet is dropped and no notification is passed upstreams at step 199. The send process 190 in the NLM 170 then returns to receive the next downstreams packet at step 191.

Illustrated in FIG. 6C is the receive process 210 for the NLM 170. First, the receive process 210 in the NLM 170 waits to receive a packet from the NIC 47 at step 211. Once a packet is received from the NIC 47, the packet is then transferred into kernel memory by the network device for that NIC 47 at step 212. The receive process 2 10 then determines whether the packet received is a TCP protocol packet at step 213. If it is determined at step 213 that the packet is not a TCP protocol packet, the receive process 210 in the NLM 170 then skips to step 217. However, if it is determined at step 213 that the packet received is a TCP protocol packet, the receive process 210 in the NLM 170 looks up and entry in the attribute mapping table 230 based upon the protocol, port number, source, and destination addresses within the received packet. At step 215, the receive process 210 then compares the entry attributes in the attribute mapping table 230 with the attributes associated with the NIC 47 that received the packet.

At step 216, the receive process 210 then determines whether the packet passes the check. If it is determined at step 216 that the packet does not pass the check, the packet is dropped without notification being passed up streams or downstreams at 218 and the receive process then returns to wait and receive the next packet at step 211. However, if it is determined at step 216 that the packet does pass the check, the packet is then passed upstreams to the IP module 107 in the IP protocol stack.

Illustrated in FIG. 7 is a block diagram of an example of the attribute map table (AMT) 230 utilized by the streams based network access control system of the present invention, as shown in FIGS. 2 and 3. The AMT 230 is created and maintained by the SFM 110 and represents the network endpoints that exist on the computer system 10. Each TCP and UDP network endpoint entry in the AMT 230 can be uniquely identified by its protocol, local port number, local address, peer port and peer address. All other IP protocol endpoints are identified based upon their protocol number.

The SFM 110 creates an entry in the AMT 230 for a network endpoint when the computer 10 (FIG. 2) creates the endpoint. At this time, all the necessary process attributes are associated with the entry for the network endpoint being created. For TCP and UDP endpoints, the protocol is specified at creation time. All other fields in the entry in the AMT 230 are unavailable at creation time and must be supplied via modifications to the entry in the AMT 230 when a packet is either sent or received. The SFM 110 must modify an entry in the AMT 230 for the endpoint, as well as the identification fields for the entry when these attributes become available. The identification fields for the entry in the AMT 230 include, but are not limited to, protocol number, local port, local address, peer port, and peer address. For instance, at bind time, the local port number and possibly the local address are specified. For protocols other than TCP and UDP, the protocol may be specified in the bind request. When establishing a TCP session, the peer address and port number are specified. This is the case for incoming TCP sessions and outgoing TCP sessions.

The netrawaccess privilege should be present on a network endpoint when the network endpoint is established for a raw IP network endpoint (any protocol other than TCP or UDP). Also, the netprivador privilege is required to be present on a network endpoint when a network endpoint is bound to a reserved port number (TCP and UDP only), that is, a port number in the range of 1 and 1023 (by default). These privileges are used in lieu of the administrative user id check (root user).

These checks are performed in the context of the SFM 110 at endpoint creation time for RAW IP endpoint types, and by the SFM 110 when a bind request is processed respectively.

Circumstances can allow for network endpoints to have the same entry identification, particularly with receiving network endpoints. It is contemplated by the inventors that multiple network endpoints may possess the same entry identification as long as the attributes match for each endpoint with the matching identification. To prevent a conflict, the AMT 230 is not allowed to create a second entry with different attributes from a first entry with the same identification. For instance, if a listening endpoint is bound to a local port A and local address B and possesses attribute C, and then a second endpoint bind request is serviced with local port A, local address B, and attributes D, the bind would be rejected. An entry in the AMT 230 is looked up prior to a packet delivery check to determine whether a packet should be delivered to its destination or not. An entry in the AMT 230 is looked up by finding the entry that matches the identification field values.

For TCP and UDP lookups, the protocol and local port numbers are required. Local port numbers do not exist for other protocols. When an entry lookup is attempted, all identification values are supplied based upon the service and destination addresses in the packet. For each entry in the AMT 230, all non zero identification fields are compared against the packet field values. If the protocol or local port number do not match, the entry is skipped. Of those that match protocol or local port number, the remaining identification fields are compared against the packet fields for the best match. The entry in the AMT 230 with the most non zero identification field matches is returned.

The packet delivery check is made by comparing two sets of attributes. For the local to local delivery, (i.e., the packet's origin and destination are both on the same local computer system 10), the attributes of each network endpoint are compared. If the attributes are compatible, the packet delivery check passes. For packets being delivered to a remote system, or packets coming in from a remote system, (the packet origin and destination are on two different computer systems), the attributes of the local network endpoint are compared with the attributes of the interface, where the packet either came from or is destined to. If the attributes are compatible, then the packet delivery check process passes.

In general, packet delivery checks involve the comparison of the attributes of two network endpoints applying the network security policy. Network attributes in this case apply to both network endpoints and NIC interface attributes. Network security policy may be extensible beyond a simple comparison of compartment labels, but in its simplest form, applies to comparison of the compartment labels of the two endpoints that possess no privileges. If the compartment labels match for each attribute, the check passes, else if the compartment labels do not match, the check fails.

Extending the network security policy to include the allowance of privileges to override the compartment label check, one can follow the following examples, assuming that two privileges potentially exist for a network endpoint, allownetaccess and netmultilevelserver. Allownetaccess privilege, when present on a receiving endpoint, allows the delivery check to succeed regardless of the values of the compartment labels of the two endpoints. Netmultilevelserver privilege, when present on the receiving endpoint, allows the delivery check to succeed if the values of the compartment labels do not match as long as one of the endpoints is not labeled as a hostile NIC interface.

It is contemplated by the inventors that additional privileges could be added to extend the features and functionality of the network security policy, if so desired.

The system and method for a streams based network access control system 100 can be implemented in hardware, software, firmware, or a combination thereof. In the preferred embodiment(s), the invention is implemented in software or firmware that is stored in a memory and that is executed by a suitable instruction execution system. If implemented in hardware, as in an alternative embodiment, the invention can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The streams based network access control system 100, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It will be apparent to those skilled in the art that many modifications and variations may be made to the preferred embodiments of the present invention, as set forth above, without departing substantially from the principles of the present invention. For example, although illustrated using only two processes, the streams based network access control system of the invention is capable of supporting many additional application programs and their corresponding processes, such as, for example but not limited to, a file transfer process, a mail server process, etc. Furthermore, it is contemplated that an application program may have more than one process running simultaneously. Further still, although illustrated using only two network interface cards, the network filter system of the invention is capable of supporting many additional network interface cards. All such modifications and variations are intended to be included herein within the scope of the present invention, as defined in the claims that follow.

What is claimed is:

1. A streams based network access control system, comprising:

a software process operating on a computer, said software process including a network endpoint attribute and configured to communicate a packet through a streams based network protocol stack to a network interface card, said network interface card including an interface attribute;

a session filter module communicating with said network protocol stack;

a network filter module communicating with said network protocol stack; and a table of network attributes associated with said session filter module and said network filter module, wherein said session filter module and network filter module compare said network endpoint attribute with said interface attribute in said table of network attributes to determine whether said software process can access said network interface card.

2. The system of claim 1, wherein said table of network attributes further comprises:

at least one network endpoint attribute; and at least one interface attribute.

3. The system of claim 1, wherein each of said at least one network endpoint attribute and said at least one interface attribute further comprise:

a compartment label; and at least one privilege value.

4. The system of claim 1, wherein said session filter module is configured to receive a communication packet, query said table of network attributes to determine said network endpoint attribute and said interface attribute, and determine whether said communication packet can be sent to said network interface card.

5. The system of claim 1, wherein said network filter module is configured to receive a communication packet from said network protocol stack, query said table of network attributes to determine said endpoint attribute and said interface attribute, place said interface attribute in said table of network attributes, and determine whether said communication packet can be sent to said network interface card.

6. The system of claim 1, wherein said network filter module is configured to receive a communication packet from said network interface card, query said table of network attributes to determine said network endpoint attribute and said interface attribute, and determine whether said communication packet can be sent to said network protocol stack.

7. A method for a streams based network access control system, the method comprising the steps of:

operating a software process on a computer, said software process including at least one network endpoint attribute;

communicating packets through a network protocol stack to a network interface card, said network interface card including at least one interface attribute;

establishing an association between said network endpoint attribute and said interface attribute;

placing said network endpoint attribute and said interface attribute in a table;

comparing said network endpoint attribute with said interface attribute; and determining whether said software process can access said network interface card.

8. The method of claim 7, wherein each of said network endpoint attributes and said interface attributes further comprise:

a compartment label; and at least one privilege value.

9. The method of claim 7, further comprising the steps of:

receiving, in a session filter module, a communication packet;

placing said network endpoint attribute in said table of network attributes;

querying said table of network attributes to determine said network endpoint attribute and said interface attribute; and determining whether said communication packet can be sent to said network protocol stack.

10. The method of claim 7, further comprising the steps of:

receiving, in a network filter module, a communication packet;

placing said interface attribute in said table of network attributes;

querying said table of network attributes to determine said network endpoint attribute and said interface attribute; and determining whether said communication packet can be sent to said network interface card.

11. The method of claim 7, further comprising the steps of:

receiving, in a network filter module, a communication packet;

querying said table to determine said network endpoint attribute and said interface attribute; and determining whether said communication packet can be sent to said network protocol stack.

12. A computer readable medium for a streams based network access control system, comprising:

logic for operating a software process on a computer, said software process including a at least one network endpoint attribute;

logic for communicating packets through a network protocol stack to a network interface card, said network interface card including at least one interface attribute;

logic for establishing an association between said network endpoint attribute and said interface attribute;

logic for comparing said network endpoint attribute with said interface attribute; and logic for determining whether said software process can access said network interface card.

13. The computer readable medium of claim 12, wherein each of said network endpoint attributes and said interface attributes further comprise:

a compartment label; and at least one privilege value.

14. The computer readable medium of claim 12, further comprising:

logic for receiving a communication packet;

logic for placing said network endpoint attribute in a table of network attributes;

logic for querying said table of network attributes to determine said network endpoint attribute and said interface attribute; and logic for determining whether said communication packet can be sent to said network protocol stack.

15. The computer readable medium of claim 12, further comprising logic configured to perform the steps of:

logic for receiving a communication packet;

logic for placing said interface attribute in a table of network attributes;

logic for querying said table of network attributes to determine said network endpoint attribute and said interface attribute; and logic for determining whether said communication packet can be sent to said network interface card.

16. The computer readable medium of claim 12, further comprising the steps of:

logic for receiving a communication packet;

logic for querying a table of network attributes to determine said network endpoint attribute and said interface attribute; and logic for determining whether said communication packet can be sent to said network protocol stack.

17. A streams based network access control system, comprising:

a means for operating a software process on a computer, said software process including network endpoint attributes;

a means for communicating packets through a network protocol stack to a network interface card, said network interface card including interface attributes;

a means for establishing an association between said network endpoint attributes and said interface attributes;

a means for placing said network endpoint attributes and said interface attributes in a table;

a means for comparing said network endpoint attributes with said interface attributes; and a means for determining whether said software process can access said network interface card.

18. The system of claim 17, wherein each of said network endpoint attributes and said interface attributes further comprise:

a compartment label; and at least one privilege value.

19. The system of claim 17, further comprising:

a means for receiving a communication packet in a session filter module;

a means for placing said network endpoint attribute in said table of network attributes;

a means for querying said table of network attributes to determine said network endpoint attribute and said interface attribute; and a means for determining whether said communication packet can be sent to said network protocol stack.

20. The system of claim 17, further comprising:

a means for receiving a communication packet in a network filter module;

a means for placing said interface attribute in said table of network attributes;

a means for querying said table of network attributes to determine said network endpoint attribute and said interface attribute; and a means for determining whether said communication packet can be sent to said network interface card.

21. The system of claim 17, further comprising:

a means for receiving a communication packet in a network filter module;

a means for querying said table of network attributes to determine said network endpoint attribute and said interface attribute; and a means for determining whether said communication packet can be sent to said network protocol stack.

* * * * *